Jan. 10, 1956   J. L. ZAVOD   2,730,496
AQUARIUM FILTER
Filed June 4, 1953   2 Sheets-Sheet 1

INVENTOR.
JOSEPH L. ZAVOD
BY
Caesar and Rivise
ATTORNEYS.

Jan. 10, 1956 J. L. ZAVOD 2,730,496
AQUARIUM FILTER
Filed June 4, 1953 2 Sheets-Sheet 2
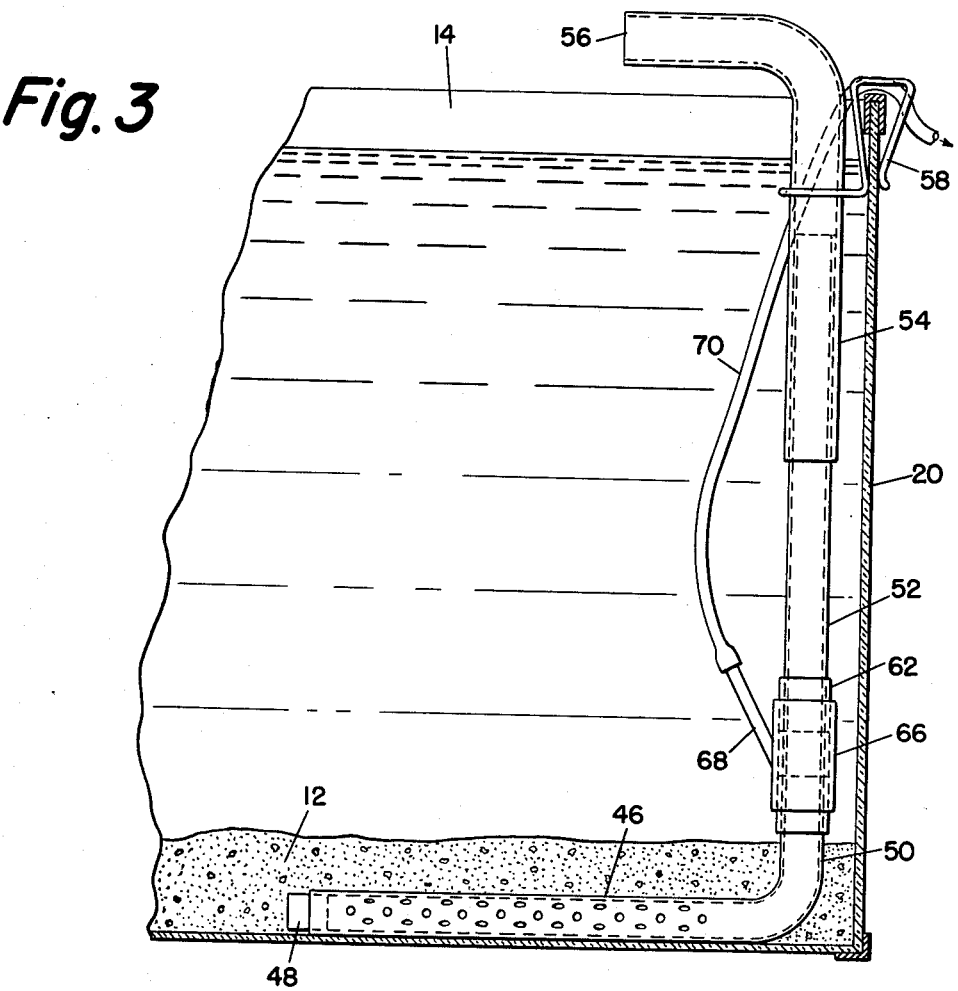
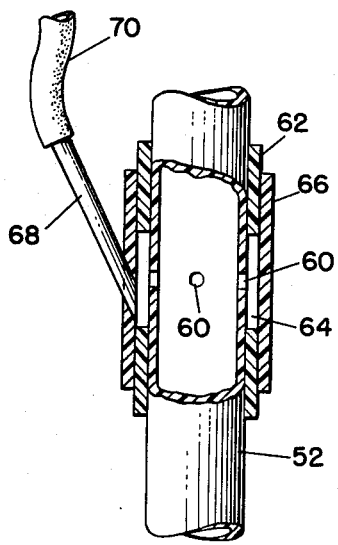
INVENTOR.
JOSEPH L. ZAVOD
BY
Caesar and Rivise
ATTORNEYS.

United States Patent Office 2,730,496
Patented Jan. 10, 1956

2,730,496

AQUARIUM FILTER

Joseph L. Zavod, Upper Darby, Pa.

Application June 4, 1953, Serial No. 359,526

8 Claims. (Cl. 210—16)

This invention relates to an aquarium filter, the primary object of which is to utilize the aquarium gravel as the filtering medium thus eliminating the need for charcoal, glass and other extraneous filtering media.

Another important object of this invention is to provide an aquarium filter of a capacity far in excess of the present filters. Thus the present filter utilizing a small 2-watt vibrator pump has a capacity of 15 to 17.5 gallons per hour as opposed to the maximum capacity of 1 to 3 gallons per hour of the present filters utilizing the same small vibrator pump.

A further object of this invention is to provide an aquarium filter which includes a vertically adjustable water delivery or return tube so that the filter can accommodate tanks from 2½ to 20 gallons capacity.

A further object of this invention is to provide an aquarium filter made of removable parts so that the same is small and compact in shipment, inexpensive and easy to assemble in an aquarium.

Yet another object of the invention is to provide an aquarium filter including removable plugs so that every portion of the filter can be cleaned with ease.

And yet another object of this invention is to provide an aquarium filter containing a specially constructed bubble chamber which serves to increase the capacity of the filter.

These and other objects of the invention will become more apparent as the following description proceeds in connection with the accompanying drawings, wherein:

Figure 3 is a side elevational view of a modified form of the filter shown assembled in a tank; and Figure 4 is an enlarged elevational view of the bubble chamber of the device shown in Figure 3, parts being broken away and shown in section to illustrate details of construction.

Specific reference will now be made to the drawings wherein similar reference characters are used for corresponding elements throughout.

In its broadest aspect, the present invention comprises a perforated chamber adapted to be positioned in an aquarium beneath the gravel bed, a vertically adjustable return tube removably connected to the perforated chamber and an air inlet tube connected to a further chamber embracing a portion of the return tube to develop suction whereby water in the aquarium will be pulled through the gravel bed into the perforated chamber and into the return tube.

While the filter may be constructed of any suitable material, it is preferred that it be constructed of colorless, transparent, non-toxic plastics, such as the vinyl plastics.

Figure 1:
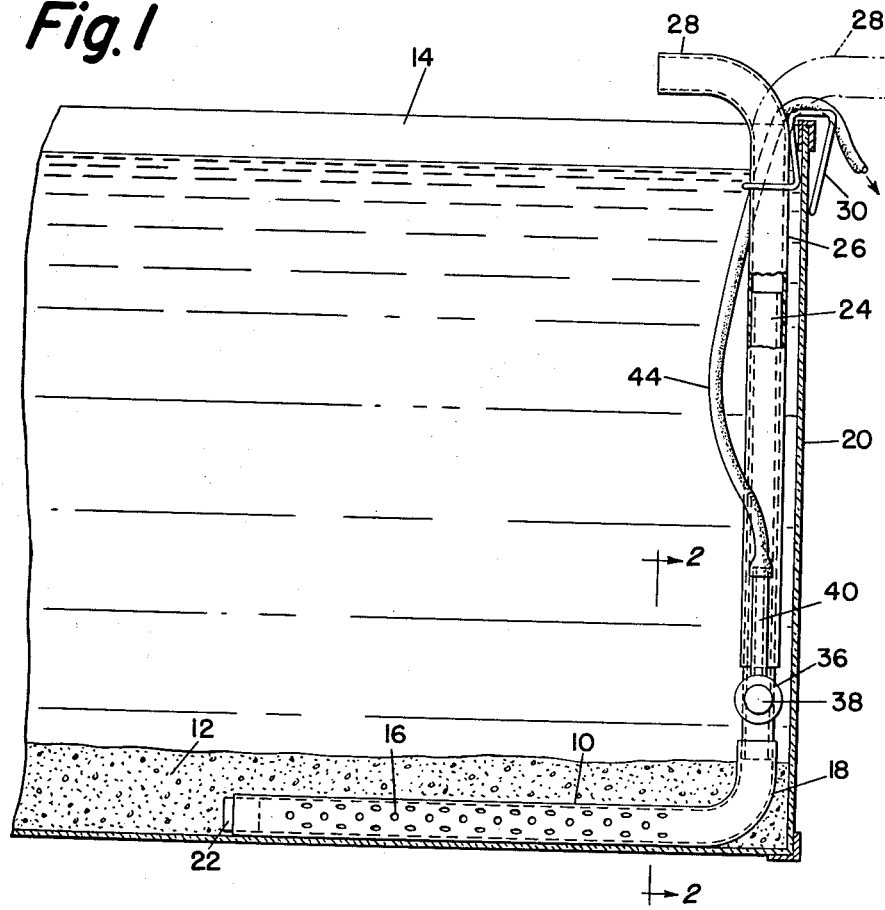
Figure 1 is a side elevational view of the present filter as assembled in an aquarium, parts being broken away to show details of construction.
Figure 2:
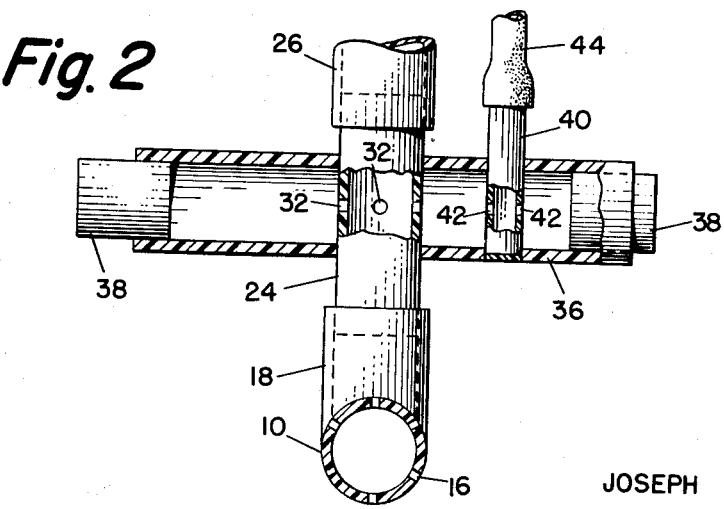
Figure 2 is an enlarged sectional view taken on the line 2—2 of Figure 1 with additional parts being broken away to show details of construction.

Referring now to Figures 1 and 2, the present filter comprises an elongated, preferably cylindrical, chamber or tube 10 which is positioned within or beneath the gravel bed 12 of a conventional aquarium tank 14. The chamber 10 includes a plurality of perforations 16 and a curved end 18 adjacent one side 20 of the tank. The opposite side of the chamber is fitted with a removable clean-out plug 22.

Removably received in the curved end 18 of the chamber 10 is a vertically extending tube 24. Telescoped with the tube 24 is a further tube 26 having a curved spout 28 at its upper end. The tube 26 is slidable on the tube 24 and because of the closeness of fit between the tubes, the tube 26 can be moved and retained in any desired adjusted vertical position to accommodate tanks of varying in capacity. The tubes 24 and 26 constitute the return tube portion of the filter. The spout 28 can be positioned to return water to the tank in normal use as shown in solid lines in Figure 1 or can be turned away from the tank to remove the water from the tank as shown in dotted lines in Figure 1. Any suitable clip 30 can be used to removably suspend the return tube and associated filter chamber 10 on the side 20 of the tank as shown clearly in Figure 1.

Intermediate the ends of the inner tube 24 of the return tube, a plurality of circumferentially spaced apertures 32 are provided. Secured to said tube 24 and embracing that portion of the tube which includes the apertures 32 is a further chamber 36 which preferably extends perpendicular to the axis of the tube 24. The chamber 36 is preferably cylindrical and is provided with removable clean-out plugs 38 at its opposite ends.

Secured to and extending into the chamber 36 is an air inlet tube 40. This air inlet tube 40 is secured in the chamber 36 in a position perpendicular to its axis and adjacent the tube 24 as shown clearly in Figure 2. The portion of the tube 40 which is confined within the chamber 36 is provided with diametrically opposed apertures 42.

A hose 44 is adapted to be attached to the air inlet tube 40 and to any suitable aerator pump.

In use, air from the aerator is delivered to the bubble chamber 36, the air emitting from the apertures 42 of the air inlet tube 40. The flow of air from the apertures 42 through the apertures 32 and up the return tube 24, 28 creates a substantial vacuum which draws water from the tank through the gravel bed 12 into the chamber 10 through its perforations 16, the filtered water being returned to the tank via the return tube 24, 28. Because of the construction of the chamber 36, the location of the circumferentially spaced apertures 32 in the return tube 24 and the diametrically opposed apertures 42 in the air inlet tube 40, a bubble of air approximating the size of the chamber 36 is produced before it enters the apertures 32 and the return tube 24. This creates such an increased suction that the present filter attains a capacity of 15 to 17.5 gallons per hour when the filter is used with a small 2-watt vibrator pump as opposed to the capacity of 1 to 3 gallons per hour using the present conventional filters with the same pump.

The modified form of the filter shown in Figures 3 and 4 operates on the same principle as the filter above described except that the horizontal bubble chamber 36 is disposed coaxially with the return tube.

The modified form of the filter comprises a perforated, preferably cylindrical, chamber or tube 46 which is positioned in or beneath the gravel bed 12 of a conventional aquarium tank 14. One end of the perforated chamber is provided with a removable clean-out plug 48 and the other or curved end 50 is removably secured to or integral with a vertically extending tube 52. The said tube 52 is slidably and adjustably received within a further telescoping tube 54 having a curved spout 56 at its upper end. The telescoped tubes 52 and 54 constitute the return tube portion of the present filter and, like the previously described filter, is vertically adjustable to accommodate tanks of varying capacity. The return tube and associated perforated filtering chamber 46 can be removably retained in the aquarium tank by any suitable clip 58.

A plurality of circumferentially spaced apertures 60 are provided in the tube 52 intermediate its ends and an inner sleeve 62 is secured coaxially with the tube 52. Said sleeve 62 includes a cut-out portion 64 constituting a bubble chamber embracing the portion of the tube 52 which includes the apertures 60, as shown clearly in Figure 4. Secured to the inner sleeve 62 coaxially therewith is an outer sleeve 66. Secured at an angle to the outer sleeve 66 and communicative with the bubble chamber 64 is an air inlet tube 68 adapted to removably receive a hose 70 operatively connected to any suitable aerator pump.

In use, the modified filter operates substantially in the same way as the one shown in Figures 1 and 2. Air is delivered from the aerator to the chamber 64 and before it enters the circumferentially spaced apertures 60 in the return tube 52 it takes the form of a bubble approximating the size or capacity of the chamber 64. In so doing and in passing through the apertures 60 and up the return tube, a substantial suction is created pulling water from the tank through the gravel bed into the perforated filtering chamber 46 and into the return tube whereby filtered water is returned to the tank through the spout 56. If desired, the spout can be turned away from the tank in which case the water will be evacuated from the tank. As in the case of the filter described in connection with Figures 1 and 2 the modified filter of Figures 3 and 4 has a capacity far in excess of the present conventional filters.

Thus it will be seen that a compact and inexpensive filter is provided which has an increased capacity, which is vertically adjustable to accommodate aquarium tanks of varying size, which has a filtering chamber which can be hidden beneath the gravel and which functions efficiently without the necessity of providing filter aids, such as charcoal, glass, etc.

While preferred embodiments of the invention have been shown and described hereinabove, it will be understood that minor variations in the construction and arrangement of parts may be made by one skilled in the art without departing from the spirit of the invention and the scope of the appended claims.

I claim:

1. An aquarium filter comprising an elongated perforated tube adapted to be placed horizontally beneath the gravel bed in an aquarium, a return tube connected to one end of said perforated tube and extending vertically therefrom, said return tube being provided with circumferentially spaced apertures intermediate its ends, means providing a chamber embracing said apertured portion of said return tube, and an air inlet tube communicative with said chamber and adapted for connection to an air pump whereby passage of air through said air inlet tube and through the apertured portion of said return tube creates suction pulling water through the gravel bed into said perforated tube and into said return tube.

2. The combination of claim 1 wherein said air inlet tube extends into said chamber and is provided thereat with diametrically opposed apertures.

3. The combination of claim 1 wherein said chamber is elongated and extends perpendicular to the axis of said return tube.

4. The combination of claim 1 wherein said chamber is elongated and extends coaxially of said return tube.

5. The combination of claim 1 wherein said chamber is elongated and includes removable clean-out plugs at its ends.

6. An aquarium filter comprising an elongated perforated tube having a removable clean-out plug at one of its ends and adapted to be placed horizontally beneath the gravel bed in an aquarium, a return tube connected to the other end of said perforated tube and extending vertically therefrom, said return tube being provided with circumferentially spaced apertures intermediate its ends, means providing a chamber embracing said apertured portion of said return tube, and an air inlet tube communicative with said chamber and adapted for connection to an air pump whereby passage of air through said air inlet tube and through the apertured portion of said return tube creates suction pulling water through the gravel bed into said perforated tube and into said return tube.

7. An aquarium filter comprising an elongated perforated tube adapted to be placed horizontally beneath the gravel bed in an aquarium, a vertically adjustable return tube connected to one end of said perforated tube and extending vertically therefrom, said return tube being provided with circumferentially spaced apertures intermediate its ends, means providing a chamber embracing said apertured portion of said return tube, and an air inlet tube communicative with said chamber and adapted for connection to an air pump whereby passage of air through said air inlet tube and through the apertured portion of said return tube creates suction pulling water through the gravel bed into said perforated tube and into said return tube.

8. An aquarium filter comprising an elongated perforated tube adapted to be placed horizontally beneath the gravel bed in an aquarium, a return tube removably connected to one end of said perforated tube and extending vertically therefrom, said return tube being provided with circumferentially spaced apertures intermediate its ends, means providing a chamber embracing said apertured portion of said return tube, and an air inlet tube communicative with said chamber and adapted for connection to an air pump whereby passage of air through said air inlet tube and through the apertured portion of said return tube creates suction pulling water through the gravel bed into said perforated tube and into said return tube.

References Cited in the file of this patent

UNITED STATES PATENTS

| Number | Name | Date |
|---|---|---|
| 1,055,082 | Rogers | Mar. 4, 1913 |
| 1,574,783 | Beth | Mar. 2, 1926 |
| 2,416,007 | Joachim | Feb. 18, 1947 |
| 2,491,853 | Feldman | Dec. 20, 1949 |
| 2,614,529 | Hansen | Oct. 21, 1952 |
| 2,676,921 | Van Steenkiste | Apr. 27, 1954 |

FOREIGN PATENTS

| 699,577 | Germany | Apr. 13, 1938 |